Nov. 2, 1943.    W. N. GLAB    2,333,243
DETACHABLE COUPLING
Filed Dec. 7, 1942    2 Sheets-Sheet 2
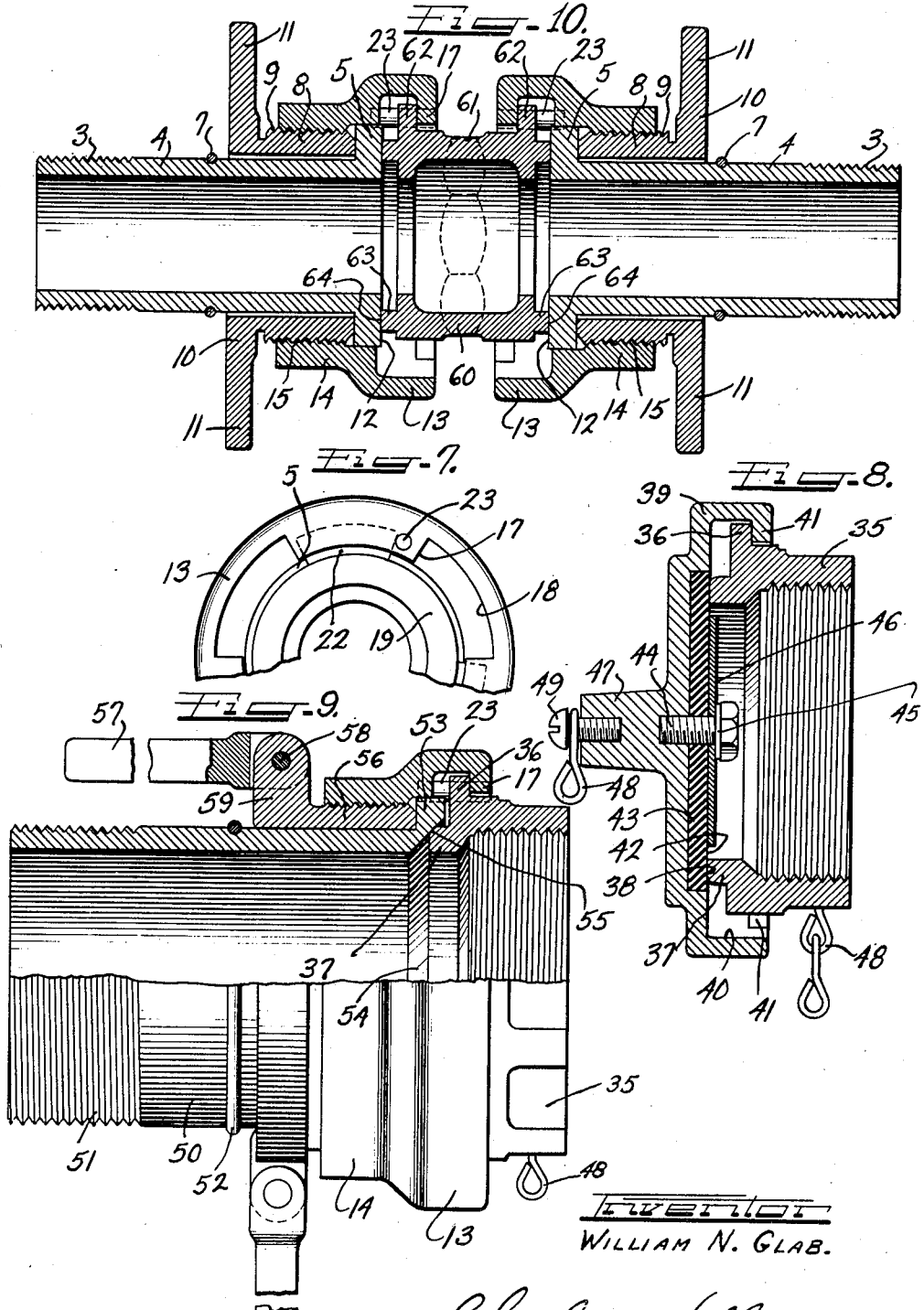

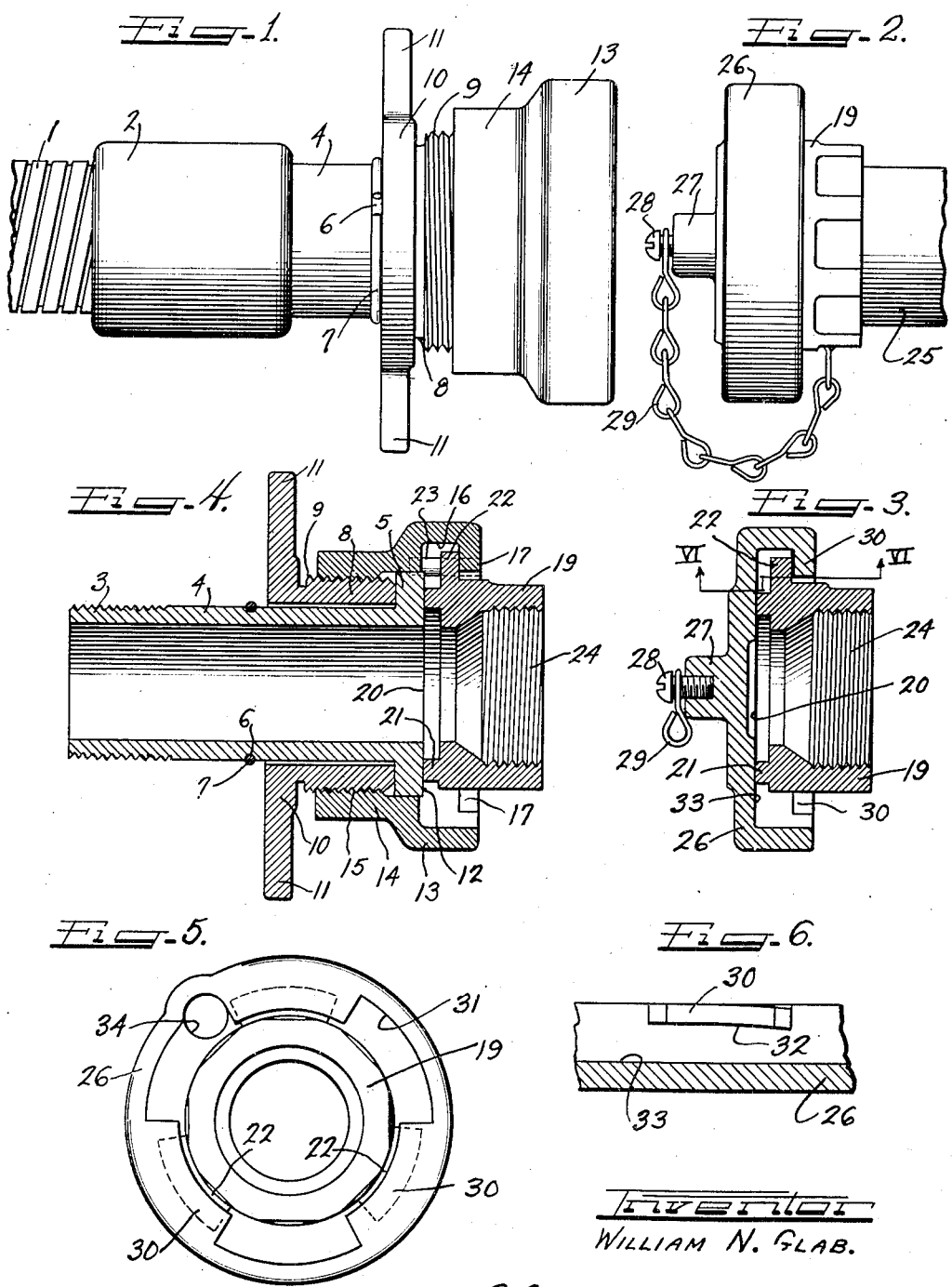

Patented Nov. 2, 1943

2,333,243

UNITED STATES PATENT OFFICE 2,333,243

DETACHABLE COUPLING

William N. Glab, Dubuque, Iowa, assignor to Morrison Brothers Company, Dubuque, Iowa, a corporation of Iowa Application December 7, 1942, Serial No. 468,039

3 Claims. (Cl. 285—177)

This invention relates to quick attachable and detachable couplings for use between hose and pipe lines or between a hose or pipe line and a tank. The improved coupling is of substantial metallic construction, adaptable for rough usage to provide a quick detachable annular sealing joint between a tank adaptor and a hose nipple or between two hose nipples, between which a flow of liquid or fluid is to be established. The improved coupling is designed and constructed to provide an improved and quick connection between pipes, hoses and the like for the convenient transmission of liquids and more particularly for the transmission of hot oils and the like from a source of supply to a distributing tank or line.

It has been found, in the conducting of hot oil and the like from one pipe to another, that it is highly desirable to provide an efficient coupling that may be operated to quickly attach and detach pipe adaptors, and one in which the attached coupling may draw the adaptors together to provide a tight leak-proof joint. These results are accomplished in this invention by means of a rotatable gland having adjustable engagement with a coupling body to bring the joint surfaces of the coupled members into sealing contact.

It is an object of this invention to provide an improved and sturdy type of quick attachable and detachable coupling wherein the coupling body has telescopically engaged therewith a rotatable gland unit which is longitudinally and rotatably adjustable on a hose or pipe nipple to move a joint contact surface into sealing engagement with an adjacent joint contact surface of a faucet or pipe adaptor engaged in the coupling body to be drawn into a tight seal with the nipple.

It is also an object of this invention to provide an improved type of quick attachable and detachable hose or pipe coupling, including rotatably and longitudinally adjustable coupling members engaging adjacent ends of pipe nipples or adaptors to draw the same together into tight sealing engagement.

It is furthermore an object of this invention to provide an improved quick attachable and detachable coupling for use in the connection of pipe nipples, adaptors and the like, said coupling including rotatably and longitudinally interfitting members movably mounted on a hose or pipe nipple for releasably receiving a faucet or pipe adaptor to draw the same into annular sealing contact with the nipple.

Another object of the invention is to provide a hose or pipe coupling unit which is slidably engaged between a flange and a locking ring of a hose or pipe adaptor or nipple on which a handle operated gland, forming a part of the coupling unit, is rotatably and adjustably engaged with the coupling unit body to move the same longitudinally thereon to bring a faucet or pipe adaptor releasably engaged therein into tight sealing contact with the pipe adaptor or nipple.

Still another object of the invention is to provide an improved and simplified type of effective quick attachable and detachable pipe coupling consisting of rotatably interfitting coupling members for engaging and sealingly drawing aligned pipe members together.

Still another object of the invention is to provide an improved and simplified sturdy type of pipe coupling wherein a pair of pipe nipples are separated by a multiple type adaptor, with each of said nipples having a quick attachable and detachable coupling unit adjustably mounted thereon and engaged over an end of the multiple type adaptor for drawing the nipples into tight sealing engagement with the ends of the multiple type adaptor by adjustable gland means forming parts of the coupling units.

It is an important object of this invention to provide an improved and simplified type of sturdy attachable and detachable coupling wherein a coupling body engaged on a pipe or hose nipple is adapted to removably receive a faucet or pipe adaptor to cause the same to be drawn into tight sealing engagement with the pipe or hose nipple by means of a handle operated coupling gland engaged on the nipple and having rotatable telescoping engagement with the coupling body.

Other and further important objects of this invention will be apparent from the disclosures in the specification and the accompanying drawings.

On the drawings:

Figure 1 is an elevational view of a quick attachable and detachable type of coupling unit embodying the principles of this invention and engaged on a nipple connected to a hose or pipe by means of an adaptor.

Figure 2 is an elevational view of a faucet or pipe adaptor with its closure cap in position, said adaptor being adaptable for projection into the coupling, when the cap is removed.

Figure 3 is a longitudinal sectional view of the adaptor and cap, with parts shown in elevation.

Figure 4 is a longitudinal sectional view through the coupling and the nipple and showing the adaptor engaged in the coupling in sealing contact with the hose or pipe nipple.

Figure 5 is an elevational view looking at the mounting end of the faucet adaptor and the open end of the adaptor cap.

Figure 6 is a fragmentary detailed sectional view taken on line VI—VI of Figure 3 to show one of the segmental projections or tongues and the groove beneath the same for receiving a corresponding projection or tongue forming part of the faucet or pipe adaptor.

Figure 7 is a fragmentary end elevational view of the adaptor receiving end of the coupling body with the adaptor engaged therein.

Figure 8 is a longitudinal sectional view, with parts in elevation, of a modified form of a faucet or pipe adaptor with a modified form of closure cap engaged thereon.

Figure 9 is a part elevational and part sectional view of a modified form of coupling coacting with modified forms of pipe nipples and adaptors provided with beveled contact sealing surfaces.

Figure 10 is a longitudinal sectional view of a modified form of coupling mechanism consisting of two coupling units for bringing the flange ends of pipe nipples into sealing surface contact with the opposite ends of a double adaptor.

As shown on the drawings:

Referring to Figures 1 to 7 inclusive, the reference numeral 1 indicates a metallic hose or pipe having connected thereto by means of an internally threaded adaptor 2, the exteriorly threaded end 3 of a pipe adaptor or nipple 4 which is in the form of a metal pipe section having an annular flange 5 integrally formed on one end thereof. The pipe adaptor or nipple 4 is provided with an annular exterior groove at 6 for receiving a split spring lock or stop ring 7 engaged therein to provide a stop for one of the members of the coupling unit as hereinafter more fully described.

Rotatably and adjustably engaged on the pipe adaptor or nipple 4 between the flange 5 and the spring lock ring 7 is a quick detachable and attachable coupling unit. The coupling unit comprises an adjustable gland comprising a cylindrical sleeve 8 having an exteriorly threaded portion 9. The threaded sleeve 8 is slidably and rotatably mounted on the nipple 4 between the flange 5 and the lock ring 7, as illustrated in Figure 4. Integrally formed on the outer end of the gland sleeve 8 is an annular head or stop flange 10 having integrally formed radially thereon a pair of oppositely directed arms or handles 11 to facilitate rotation of the gland in a coupling operation. As shown in Figure 4, the inner end of the gland sleeve 8 is positioned to contact one side of the nipple flange 5 to force an outer joint contact surface 12 of the nipple flange 5 outwardly.

Cooperating with the coupling gland is a coupling body 13 having integrally formed on one end thereof a coupling body sleeve 14 which is internally threaded at 15 and has threaded engagement with the exteriorly threaded portion 9 of the gland sleeve 8. The outer end of the coupling body 13 includes an inner peripheral groove 16 to the inside of a plurality of circumferentially spaced inwardly directed projections or segment shaped tongues 17 which are separated by segment shaped openings or recesses 18. The segment shaped tongues 17 separated by the openings or recesses 18 form a female unit of a quick release connection adapted to removably receive a male unit of the quick release connection. The quick release connection is adapted to be formed between the female unit of the coupling body 13 and the male unit which is formed on one end of a faucet, pipe or hose adaptor 19 with which the hose or pipe nipple 4 is adapted to be aligned, with the joint contact surface 12 thereof in tight sealing engagement with a joint contact annular surface 20, which forms the end surface of a ring or annular flange 21 which is integrally formed on the outer end of the faucet adaptor 19. The outer end of the faucet or pipe adaptor 19 is also constructed to form the male unit of a quick release connection to permit the male end of the adaptor 19 to be inserted into the open or coupling end of the coupling body 13. A plurality of segment shaped projections or tongues 22 are integrally formed in spaced relation around the periphery at one end of the adaptor 19 and project outwardly to form the male unit of the quick release connector. The male unit tongues 22 are projected into the segment shaped openings or recesses 18 formed between the tongues 17 of the coupler body 13, to permit the male tongues 22 to project into the inner peripheral groove 16 of the coupling body and be engaged against the inner surfaces of the projections or tongues 17. By the rotative movement of either the coupling body 13 or the adaptor 19, the adaptor 19 is positioned in substantial alignment with the hose or pipe nipple 4 to position the contact surface 20 of the adaptor ring 21 adjacent the contact surface 12 of the nipple flange 5 in position ready to form a tight seal joint or annular surface contact between the adaptor 19 and the nipple 4.

The surface contact seal between the adaptor 19 and the nipple 4 is readily made by merely engaging the handles 11 and rotating the gland sleeve 8 within the threaded coupling sleeve 14, thereby causing the end surface of the gland sleeve 8 to engage against the flange 5 of the nipple 4 and at the same time cause inward movement of the coupling body 13 to cause the tongues 17 to tightly grip against the tongues 22. This rotative movement of the gland causes telescoping movement of the gland and the coupling body with respect to one another thereby forcing the adaptor ring 21 and the nipple flange 5 into tight sealing engagement to form a tight leak-proof seal between the surfaces 12 and 20.

When the male unit members or tongues 22 of the adaptor 19 are projected into the openings 18 of the coupling body 13, the rotation of the adaptor within the coupling body is limited by means of a stop pin 23 which is engaged through the end portion of one of the projections or tongues 17 with the inner end of the stop pin secured or driven into the material forming the coupling body 13, as clearly illustrated in Figure 4. The stop pin 23 thus acts as a means for limiting the rotation of the faucet or pipe adaptor 19 so that the male tongues 22 are properly positioned in back of the tongues 17 forming part of the female connecting unit on the coupling body 13.

As clearly illustrated in Figures 3 and 4 the interior of the supporting end of the adaptor 19 is internally threaded at 24 to permit the adaptor 19 to be threaded onto an externally threaded portion of a faucet or pipe 25. The pipe member 25 may be the end of a faucet such as utilized in connection with tank trucks for handling hot oil, hydrocarbons or other fluids. If desired, the pipe section 25 may be the end of a fill pipe of a storage tank to permit hot oil or other liquid from a source of supply to be conducted through the flexible metal hose 1 and through the quick detachable and attachable coupling unit when the coupling unit is connected as illustrated in Figure 4 to form a leak-proof seal joint.

When the coupling body 13 is removed from the faucet or pipe adaptor 19 the open end of the adaptor 19 may be quickly closed by means of a closure cap 26 of chambered construction open at one end and closed at the other. Integrally formed on the closed end of the cap 26 is an axially positioned outwardly projecting boss or knob 27 having a stove bolt 28 secured axially therein for supporting one end of a chain 29 anchored to the cap. The other end of the anchoring chain 29 is secured to an eye fastened on the faucet adaptor 19 as clearly illustrated in Figure 2.

The open end of the removable cap 26 is provided with integral inwardly projecting segment shaped projections or tongues 30 which are circumferentially spaced from one another by openings or recesses 31 which are also segment shaped, as clearly illustrated in Figure 5, to form a female unit for the reception of the male projections or tongues 22 of the faucet or pipe adaptor 19. As clearly illustrated in Figure 6, the projections or tongues 30 of the cap member 26 are deflected at one end to provide cam surfaces 32 on the tongues 30 to permit the cap 26, when engaged on the outer end of the adaptor 19, to be tightly turned into place by the action of the cam surfaces 32 of the tongues 30 against the tongues 22 of the adaptor so that the contact surface 20 of the adaptor ring 21 is brought into tight sealing engagement with the inner surface 33 of the cap 26 to form a tight seal between the adaptor 19 and the cap 26, as clearly illustrated in Figure 3.

For the purpose of holding the cap 26 locked against removal from the faucet adaptor 19, the cap 26 is provided with an opening 34 for the reception of the hasp of a padlock. The hasp of a selected type of lock may be inserted through the opening 34 whereby movement of the cap 26 is prevented by the movement of the padlock hasp into engagement with one of the projections or tongues 22. The cap 26 cannot be rotated in an opposite direction for removal due to the cam or deflected shape of the tongues 30.

Referring now to Figure 8, an internally threaded faucet or pipe adaptor 35 is formed with a male connector consisting of outwardly directed segment shaped projections or tongues 36 which are circumferentially spaced from one another. The adaptor 35 is provided with an annular contact ring 37 having a sealing surface 38 formed thereon.

For the purpose of removably closing the outer end of the adaptor 35 a modified form of closure cap 39 is provided having a circular groove or opening 40 therein for the reception of the outer end of the adaptor 35. Integrally formed on the closure cap 39 are inwardly directed segment shaped projections or tongues 41 which are spaced from one another and are deflected at one end to form cam contact surfaces similar to the cam surfaces 32 of the tongues 30 shown in Figure 6. The tongues 41 within the cap 39 have segment shaped openings or recesses therebetween to form a female unit of a connector to permit the cap 39 to be rotatably and lockingly engaged on the male connector end of the adaptor 35.

When the cap 39 is engaged on the outer end of the adaptor 35, a tight seal is formed between the adaptor ring 37 and the cap by the contact of the seal surface 38 of the adaptor ring 37 with a sealing surface 42 of a centrally apertured disk gasket 43 of synthetic composition. The synthetic disk gasket 43 is seated in a suitable recess formed within the cap 39, and is held in place by means of a stove bolt 44 which projects through a lock washer 45 and a metal washer or disk 46 and is threaded into the material forming the cap 39. Integrally formed on the cap 39 is a boss or stud 47 having one end of an anchor chain 48 attached thereto by means of a stove bolt 49. The other end of the anchor chain 48 is secured to the exterior of the adaptor 35.

Figure 9 illustrates a modified form of a hose or pipe coupling connection including a modified form of quick attachable and detachable coupling unit used in connection with modified forms of a hose or pipe nipple and a faucet or pipe adaptor.

In this modified form of the construction the reference numeral 50 indicates a metal pipe section or nipple which is externally threaded at 51 at one end to facilitate connection to a hose or pipe by means of any suitable type of adaptor or connector. The nipple 50 is provided with a peripheral groove for receiving a split spring lock ring 52. Integrally formed on the opposite or second end of the nipple 50 is a flange 53. The flanged end of the nipple 50 is chamfered or ground to provide a beveled contact surface or seat 54 against which a rounded annular contact edge 55 of the adaptor ring 37 is adapted to be pressed to provide a tight joint or seal between the nipple 50 and a faucet or pipe adaptor 35.

The tight sealing joint between the beveled surface 54 and the contact edge 55 of the nipple 50 and the adaptor 35 respectively is accomplished by means of a modified form of quick attachable and detachable coupling gland 56 which is similar to the construction of the coupling illustrated in Figures 1 and 4 with the exception that the rigid arms or handles 11 are replaced by swinging or pivotal arms or handles 57 which are pivotally connected by means of rivets or pins 58 to radially directed projections 59 which are integrally formed on the gland sleeve 56. The coupling body 13 is identical to that disclosed in Figures 1 and 4.

In the modified form of coupling assembly illustrated in Figure 9, the gland 56 is rotated by means of the pivotal handles 57 into a retracted position toward the lock ring 52 thereby permitting the male member on the adaptor 35 to be engaged in the female member of the coupling body 13 with one of the tongues 36 of the adaptor 35 in contact with the stop pin 23 to properly position the male tongues 36 in proper position in back of the female tongues 17. In this construction the seal ring 37 of the adaptor 35 projects into the flanged end of the nipple 50. To complete the tight seal or joint between the nipple 50 and the adaptor 35 it is only necessary to rotate the gland sleeve 56 by means of the pivoted handles 57, to move the gland sleeve away from the lock ring 52 thereby causing a movement of the sleeve 56 and the coupling housing 13 toward each other to bring the rounded contact edge 55 of the adaptor 35 into tight sealing engagement with the beveled contact surface 54 of the nipple 50 to rapidly complete the coupling and establish a tight seal joint between the aligned nipple 50 and the adaptor 35.

Figure 10 illustrates another modified form of coupling arrangement wherein two hose or pipe units are adapted to be tightly connected in aligned relationship by a multiple arrangement of improved coupling units in combination with a multiple type adaptor.

In the form of coupling arrangement shown in Figure 10; the pipe nipples and the improved coupling units are identical with those illustrated and described in connection with Figure 4, and like parts are designated by corresponding reference numerals. The two pipe sections or nipples 4 are arranged with the flanged ends thereof positioned adjacent one another and separated by means of an improved multiple or double type adaptor or male unit for cooperation with the female portions of the coupling bodies 13.

The multiple or double type of male adaptor comprises a cylindrical body 60 having a central polygonal nut portion 61 to permit application of a wrench or other suitable tool to rotate the adaptor when assembling or disassembling a coupling connection. Integrally formed near each end of the double adaptor body 60 are a plurality of spaced outwardly projecting segment shaped projections or tongues 62 to form male connecting members which are adapted to be projected through the openings 18 of the respective coupling bodies 13 after which the double adaptor 60 is rotated to position and engage the male tongues 12 in back of the female tongues 17 of the coupling bodies 13. The rotation of the double adaptor 60 within the chambered ends of the coupling bodies 13 is limited by means of the stop pins 23. Integrally formed on each end of the double adaptor body 60 is a ring or annular flange 63 having an annular contact surface 64 positioned adjacent the contact surface 12 of an adjacent nipple 4.

With the multiple or double type adaptor 60 positioned between the flanges 5 of the aligned hose or pipe nipples 4 the coupling glands 8 are rotated by means of the handles 11 into operating engagement with the coupling bodies 13, thereby causing the sealing or contact surfaces 12 of the nipple flanges 5 to be brought into tight sealing non-leaking engagement with the annular contact surfaces 64 of the end flanges 63 to complete the coupling arrangement.

From the foregoing description it will be apparent that the present invention provides an improved type of quick attachable and detachable coupling construction whereby a hose or pipe for the conduction of hot oils or other liquids may be quickly coupled to the mouth of a faucet or to another hose or pipe by merely removing the closure cap from the faucet adaptor and then engaging the female connector end of a coupling body over the male connecting end of the faucet adaptor and then rotating the coupling body a distance permitted by the stop pin therein to properly position the male tongues of the adaptor in back of the female tongues of the coupling body. The operation just described properly positions the sealing or contact surfaces of the adaptor and the nipple in proper relation to permit a tight seal to be established by merely rotating the coupling gland by means of the handles so that the coupling members are moved inwardly over one another to tightly draw the adaptor and nipple together to establish the desired seal between the metal contact surfaces of the adaptor ring and the nipple flange.

The improved coupling is of a quick detachable type and may be readily disconnected by merely rotating the gland 8 outwardly with respect to the coupling body 13 to release the adaptor 19 permitting the same to be slightly rotated and then removed from the interfitting or interlocking engagement with the female connecting means formed on the outer end of the coupling body.

It will of course be understood that various details of construction may be varied through a wide range without departing from the principles of this invention and it is therefore not the purpose to limit the patents granted hereon otherwise than necessitated by the scope of the appended claims.

I claim as my invention:

1. In a quick disconnect coupling structure, a coupler body, a compression sleeve therein, a nipple extending through the sleeve in rotatable and axially slidable relation thereto, and a disconnectable adapter arranged to be pressed against the nipple to provide a sealing contact between adjacent surfaces of the nipple and the adapter, interengaging threads on the coupler body and the sleeve to afford axial pressure action between the parts, a radially extending flange member on the inner end of the nipple and disposed over the inner end of the sleeve, a radially inwardly extending flange member on the coupler body having radial recesses therein, said adapter having a sealing part arranged for pressed sealing engagement with the flange of the nipple when the sleeve is screwed into the coupler body and radially extending lugs arranged to be passed through said radial recesses in the coupler body and rotated for interlocking engagement with said radially inwardly extending flange.

2. In a quick disconnect coupling assembly, a nipple having a sealing face on the inner end thereof, an adapter having a sealing face at the inner end thereof, said nipple and adapter comprising a sealed, liquid retaining circuit when said sealing faces are pressed together, means for coupling said nipple and adapter in sealed relation including a coupler body, and a threaded element arranged for threaded engagement with the coupler body and cooperating with the nipple so as to force the nipple inwardly of the coupler body when the element is rotated relative to said body, radially outwardly extending members on said adapter, said members each having a plane surface on the outer side thereof, a radially recessed flange on the coupler body, said flange having a plane inner surface arranged to interlockingly abut the respective plane surfaces on the said adapter members when the nipple and adapter are pressed together, and to afford release of said interlocking abutment immediately upon release of pressure between the nipple and the adapter.

3. In a quick disconnect coupling assembly, a nipple having a sealing face on the inner end thereof, an adapter having a sealing face at the inner end thereof, said nipple and adapter comprising a sealed, liquid retaining circuit when said sealing faces are pressed together, means for coupling said nipple and adapter in sealed relation including a coupler body, and means arranged for axial engagement with the coupler body and for cooperating with the nipple to force the nipple inwardly of the coupler body when the said means is moved axially relative to said body, radially extending members on said nipple, said members each having a plane surface on the outer side thereof, a radially recessed flange on the coupler body, said flange having a plane inner surface arranged to interlockingly abut the respective plane surfaces on the said adapter members when the nipple and adapter are pressed together, and to afford release of said interlocking abutment immediately upon release of pressure between the nipple and the adapter.

WILLIAM N. GLAB.